(12) United States Patent
Han (10) Patent No.: US 9,324,990 B2
(45) Date of Patent: Apr. 26, 2016

(54) BATTERY MODULE

(71) Applicant: Samsung SDI Co., Ltd., Yongin-si, Gyeonggi-do (KR)

(72) Inventor: Minyeol Han, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 93 days.

(21) Appl. No.: 14/231,353

(22) Filed: Mar. 31, 2014

(65) Prior Publication Data

US 2015/0132618 A1    May 14, 2015

(30) Foreign Application Priority Data

Nov. 8, 2013    (KR) .................. 10-2013-0135744

(51) Int. Cl.
    *H01M 2/12*     (2006.01)
    *H01M 2/34*     (2006.01)

(52) U.S. Cl.
    CPC ...................................... *H01M 2/345* (2013.01)

(58) Field of Classification Search
    None
    See application file for complete search history.

(56) References Cited

U.S. PATENT DOCUMENTS

| 2010/0227205 A1* | 9/2010 | Byun et al. .......... 429/61 |
| 2011/0104528 A1* | 5/2011 | Byun et al. .......... 429/61 |
| 2011/0151311 A1* | 6/2011 | Lee et al. .......... 429/156 |
| 2011/0262799 A1* | 10/2011 | Kim .......... 429/156 |
| 2012/0015218 A1 | 1/2012 | Lee |
| 2012/0225333 A1* | 9/2012 | Kim .......... 429/61 |
| 2012/0328918 A1 | 12/2012 | Kim |

FOREIGN PATENT DOCUMENTS

| JP | 2012-230775 A | 11/2012 |
| JP | 2013-008673 A | 1/2013 |
| KR | 2012-0009592 A | 2/2012 |

\* cited by examiner

*Primary Examiner* — Patrick Ryan
*Assistant Examiner* — Jose Colucci Rios
(74) *Attorney, Agent, or Firm* — Knobbe Martens Olson & Bear LLP (57) ABSTRACT

A battery module, which can improve safety against overcharge and puncture on a module basis. The battery module includes a plurality of battery cells arranged in a row, each of the plurality of battery cells including terminals and a safety vent, a plurality of bus bars connecting the plurality of battery cells, a duct mechanically coupled to the plurality of battery cells to seal the safety vent, an extension plate electrically connected to a first battery cell among the plurality of battery cells and extending toward the duct, and a short-circuit plate electrically connected to a second terminal of a second battery cell among the plurality of battery cells and extending toward the duct, wherein the duct is electrically connected to the extension plate and is spaced apart from the short-circuit plate.

16 Claims, 9 Drawing Sheets

BATTERY MODULE

CROSS-REFERENCE TO RELATED APPLICATIONS

This application claims priority to and the benefit of Korean Patent Application No. 10-2013-0135744, filed on Nov. 8, 2013, the entire content of which is incorporated herein by reference.

BACKGROUND

1. Field

Aspects of the present invention relate to a battery module.

2. Description of the Related Technology

A rechargeable lithium ion secondary battery may be used, for example, in a small-sized electronic device, such as a notebook computer or a cellular phone. Also, because recently developed rechargeable lithium ion secondary batteries have advantageous characteristics, including high output power, high capacity, and lightness in weight, as compared to other types of rechargeable secondary batteries, they are widely used in hybrid vehicles or electric vehicles.

Since a lithium ion secondary battery used in a hybrid vehicle or an electric vehicle has a relatively high capacity, it is important to provide a safety device against overcharge or puncture. The safety device should rapidly cut off a charge or discharge path when the lithium ion secondary battery is overcharged or punctured.

SUMMARY OF CERTAIN INVENTIVE ASPECTS

Aspects of the present invention provide a battery module, which can improve safety against overcharge and puncture on a module basis.

In accordance with one aspect of the present invention, there is provided a battery module including a plurality of battery cells arranged in a row, each of the plurality of battery cells including first and second terminals and a safety vent, a plurality of bus bars connecting the plurality of battery cells, a duct mechanically coupled to the plurality of battery cells to seal the safety vent and having a space that is in communication with the safety vents of the plurality of battery cells, an extension plate electrically connected to a first battery cell among the plurality of battery cells and extending toward the duct, and a short-circuit plate electrically connected to a second terminal of a second battery cell among the plurality of battery cells and extending toward the duct, wherein the duct is electrically connected to the extension plate and is spaced apart from the short-circuit plate.

In the battery module according to one aspect of the present invention, the first battery cell may be a battery cell positioned in the first place among the plurality of battery cells arranged in a row, and the second battery cell may be a battery cell positioned in the last place among the plurality of battery cells.

The duct includes a first region facing the plurality of battery cells and a second region spaced apart from the first region and wherein a through hole corresponding to the safety vent of each of the battery cells may be provided in the first region of the duct.

When the battery module is overcharged, the safety vent of each of the battery cells may be opened due to an increase in the internal pressure of the battery cell to release internal gases to the duct.

A membrane, which is electrically short circuited to the short-circuit plate when the battery module is overcharged, may be provided in the duct.

The short-circuit plate may have one side connected to the second terminal of the second battery cell and the other side spaced apart from the membrane at a location corresponding to the membrane.

When the battery module is overcharged, the membrane may be inverted due to an increase in the internal pressure of the duct to then be electrically short circuited to the short-circuit plate.

The duct may further include vents thinner than the walls of the duct.

The vents may have a higher operating pressure than the safety vent of each of the battery cells.

An insulation layer may be interposed between the duct and each of the battery cells to electrically insulate the duct and the battery cell.

The insulation layer may have a hole formed at a region corresponding to the safety vent of each of the battery cells.

The extension plate may have one side connected to the first terminal of the first battery cell and the other side connected to the duct.

The short-circuit plate may be positioned higher than the extension plate on the basis of the duct.

Each of the battery cells may include an electrode assembly, a case accommodating the electrode assembly, and a cap plate which seals the case and through which the first and second terminals pass.

The safety vent may be thinner than the cap plate at a portion of the cap plate.

Each of the battery cells may further include a fuse provided between the electrode assembly and the first terminal.

The fuse may be melted to then be cut when the battery module is overcharged.

As described above, in the battery module according to the present invention, during overcharge, a charge current is not supplied to a battery cell but is bypassed through a duct, thereby improving overcharge safety of the battery module.

In addition, a membrane is installed in a duct integrally connected to a plurality of battery cells, rather than being installed in each of the plurality of battery cells, and operates with overall pressure of the plurality of battery cells, so that the battery module has uniform the operating pressure as a whole, thereby securing improved safety.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF CERTAIN INVENTIVE EMBODIMENTS

Hereinafter, an exemplary embodiment of the invention will be described in detail with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In the drawings, the thickness of layers and regions are exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer and/or part discussed below could be termed a second member, element, region, layer and/or part without departing from the teachings of the present invention.

In addition, as used herein, the term "short circuit member" means an element for improving both overcharge safety and puncture safety of a battery module. Further, as used herein, the term "short circuit member" does not mean that it is installed in each battery cell but means that one short circuit member is installed at an exterior side of a battery module having a plurality of battery cells arranged in a row.

Figure 1:
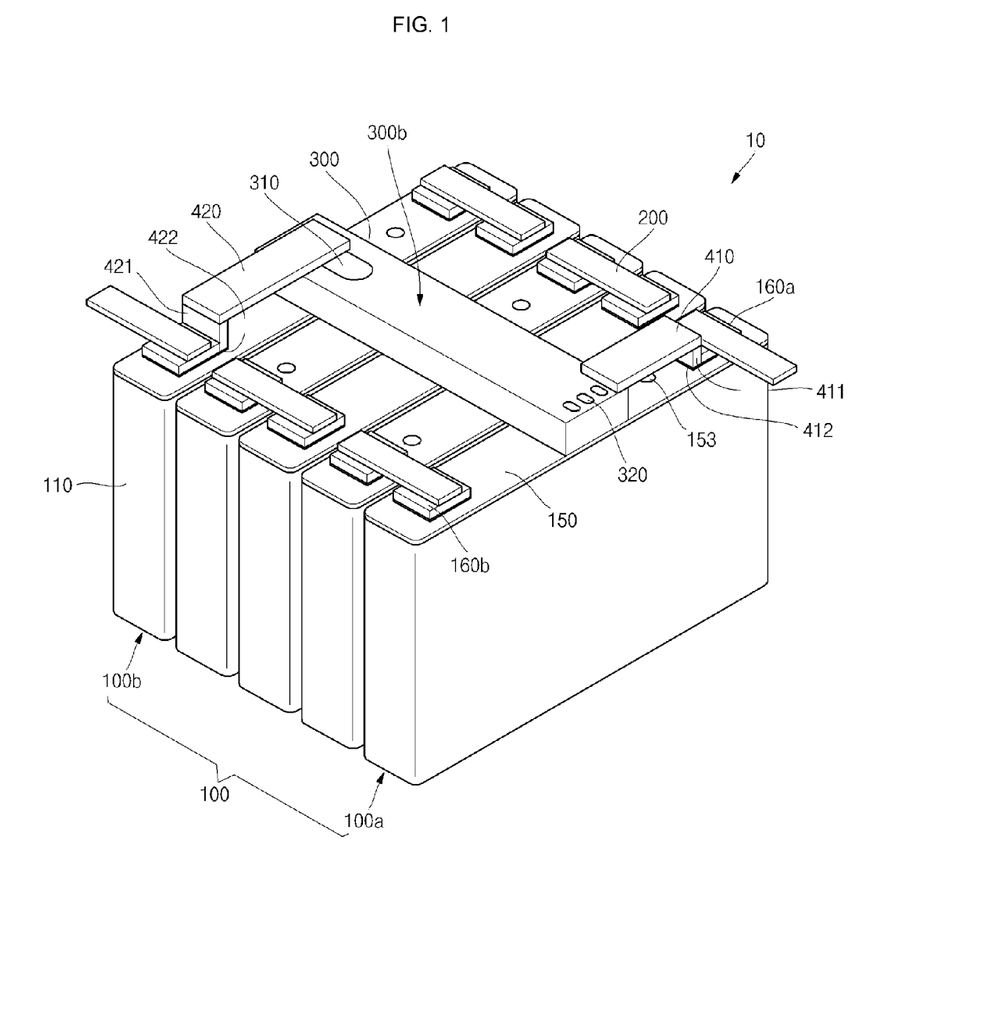
FIG. 1 is a perspective view of a battery module according to an embodiment of the present invention.
Figure 2:
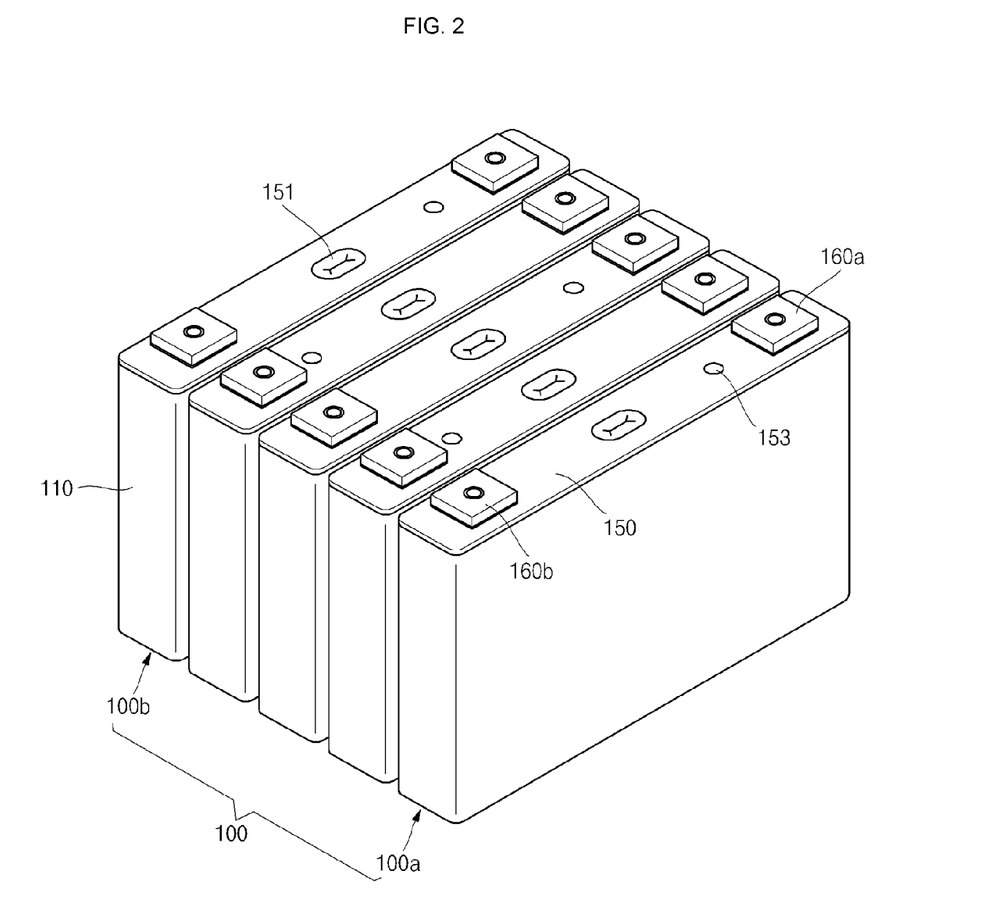
FIG. 2 is a perspective view illustrating only battery cells of a battery module according to an embodiment of the present invention.
Figure 3:
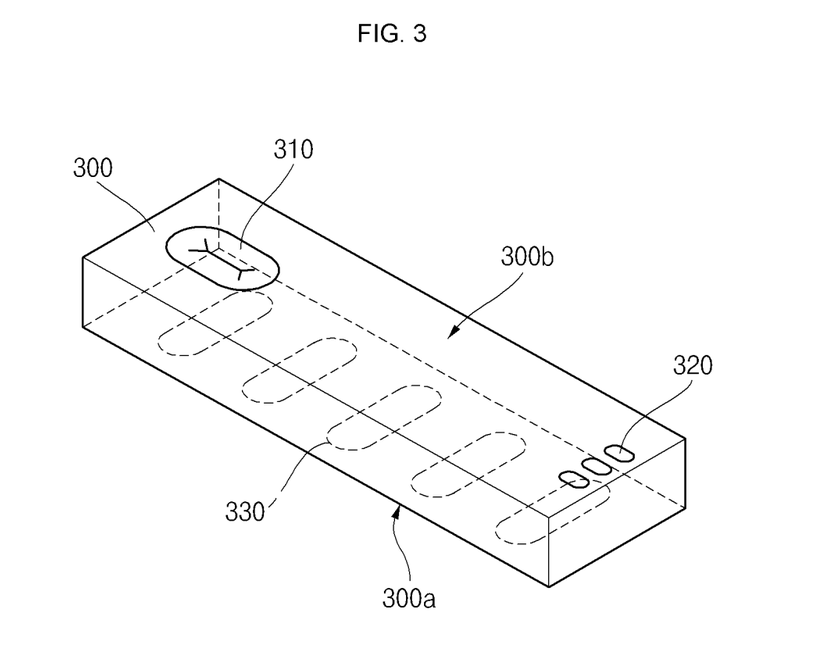
FIG. 3 is a perspective view illustrating only a duct of a battery module according to an embodiment of the present invention.

FIG. 1 is a perspective view of a battery module according to an embodiment of the present invention, FIG. 2 is a perspective view illustrating only battery cells of a battery module according to an embodiment of the present invention, and FIG. 3 is a perspective view illustrating only a duct of a battery module according to an embodiment of the present invention.

Referring to FIGS. 1 to 3, the battery module 10 according to an embodiment of the present invention includes a plurality of battery cells 100, a plurality of bus bars 200, a duct 300, an extension plate 410 and a short circuit plate 420.

The plurality of battery cells 100 may be horizontally arranged in a row. In the following description, a first battery cell 100a means a battery cell positioned first among the plurality of battery cells 100 arranged in a row, and a second battery cell 100b means a battery cell positioned last among the plurality of battery cells 100. Therefore, a plurality of other battery cells may or may not be positioned between the first battery cell and the last battery cell.

Each of the plurality of battery cells 100 includes a case 110, a cap plate 150 covering the case 110, and a first terminal (e.g., a positive electrode terminal) 160a and a second terminal (e.g., a negative electrode terminal) 160b protruding upwardly through the cap plate 150. Here, the cap plate 150 may be a portion of the case 110, and the case 110 and the cap plate 150 make the battery cell 100 have a generally prismatic shape.

The first terminal 160a is electrically connected to the cap plate 150, and the case 110 and the cap plate 150 may have the same polarity (e.g., a positive polarity) with the first terminal 160a. In addition, the cap plate 150 may further include a safety vent 151 releasing internal gases to the duct 300 during overcharge, and a plug 153 closing an electrolyte injection hole through which an electrolytic solution is injected in the course of manufacturing the battery cell. Here, the safety vent 151 may be configured to have an operating pressure of 2 to 4 kgf. The configuration of each of the battery cells 100 will be described below in more detail.

The plurality of bus bars 200 may electrically connect the plurality of battery cells 100 in series. That is to say, the plurality of bus bars 200 may electrically connect the first terminal 160a (or the second terminal 160b) of each of one-side battery cells 100 to the second terminal 160b (or the first terminal 160a) of the other-side battery cells 100 adjacent to the one-side battery cells 100. Here, the plurality of bus bars 200 may also electrically connect the plurality of battery cells 100 in parallel.

The duct 300 has a first region 300a facing the plurality of battery cells 100 and a second region 300b facing and spaced apart from the first region 300a. The duct 300 has an empty inner space to receive gases released from the battery cells 100. In addition, the duct 300 is shaped of a rectangular parallelepiped, but aspects of the present invention are not limited thereto.

The duct 300 is mechanically coupled to top portions of the plurality of battery cells 100 to seal the safety vent 151. That is to say, the first region 300a of the duct 300 is mechanically connected to the battery cells 100. In addition, the first region 300a has a through hole 330 formed at a region corresponding to the safety vent 151. The gases released from the battery cells 100 through the through hole 330 are induced into the duct 300.

In addition, a plurality of vents 320 may be formed at one side of the second region 300b. When the duct 300 has an internal pressure exceeding a predetermined level due to overcharge, the vents 320 are opened to release internal gases to the outside. Here, the vents 320 may be configured to have an operating pressure of 6 to 9 kgf. That is to say, the vents 320 have a higher operating pressure than the safety vent 151 of the battery cells 100. Therefore, the safety vent 151 is first opened to allow gases to be induced into the duct 300. When the internal pressure of the duct 300 further rises, the vents 320 are then opened to release the gases.

A membrane 310 that is downwardly convex is formed at the other side of the second region 300b. In a normal state, the membrane 310 faces downward, and in an overcharged state, it is inverted due to an increase in the internal pressure to then face upward. The operation of the membrane 310 will be described below in more detail.

The extension plate 410 is electrically connected to the first terminal 160a of the first battery cell 100a among the plurality of battery cells 100. In more detail, the extension plate 410 is electrically connected to the first connection member 411 electrically connected to the first terminal 160a. Meanwhile, an insulation layer 412 may further be formed under the first connection member 411 to be electrically insulated from the cap plate 150. Here, when the cap plate 150 and the first terminal 160a have the same polarity, the insulation layer 412 may not be provided. In addition, in the illustrated embodiment, the first connection member 411 is formed on a top surface of the cap plate 150. However, the first connection member 411 may also be formed on a top surface of the first terminal 160a.

The extension plate 410 has one side electrically connected to the first terminal 160a and the other side electrically connected to the duct 300. Therefore, the duct 300 may have the same polarity (e.g., a positive polarity) with the first terminal 160a.

The short-circuit plate 420 is electrically connected to the second terminal 160b of the second battery cell 100b among the plurality of battery cells 100. In more detail, the short-circuit plate 420 is electrically connected to a second connection member 421 electrically connected to the second terminal 160b. Here, the second connection member 421 may have a height greater than that of the first connection member 411. Meanwhile, an insulation layer 422 may be formed under the second connection member 421 to be electrically insulated from the cap plate 150. In addition, in the illustrated embodiment, the second connection member 421 is formed on a top surface of the cap plate 150. However, the second connection member 421 may also be formed on a top surface of the second terminal 160b.

The short-circuit plate 420 has one side electrically connected to the second terminal 160b. Therefore, the duct 300 may have the same polarity (e.g., a negative polarity) with the second terminal 160b. In addition, the short-circuit plate 420 has the other side electrically spaced apart from the membrane 310 at a location corresponding to the membrane 310. That is to say, since the second connection member 421 has a greater height than the first connection member 411, the short-circuit plate 420 is spaced apart from the duct 300. Therefore, in a normal state, the short-circuit plate 420 and the membrane 310 having different polarities are electrically insulated from each other. However, in an overcharged state, the membrane 310 is inverted to face upward, so that it comes into contact with the short-circuit plate 420, resulting in a short circuit.

As described above, the battery module 10 according to the embodiment of the present invention, may have improved safety against overcharge on a module basis. In more detail, the membrane 310 is installed in the duct 300 positioned at the exterior of the battery module 10, rather than being installed in each of the plurality of battery cells 100, so that overcharge current is bypassed through the duct 300 during overcharge of the battery module 10, thereby improving overcharge safety of the battery module 10.

That is to say, when the internal pressure of the battery cell 100 increases due to overcharge, the internal gases are released through the safety vent 151 to then be induced to the duct 300. Then, when the internal pressure of the battery cell 100 exceeds a predetermined level, the membrane 310 is inverted to come into contact with the short-circuit plate 420 having a different polarity from the membrane 310, resulting in a short circuit. Therefore, the overcharge current is bypassed through the membrane 310, thereby improving the overcharge safety of the battery module 10.

In addition, the membrane 310 is not formed in each of the plurality of battery cells 100 but is formed in the duct 300, thereby further improving the safety against overcharge of the battery module 10. That is to say, the membrane 310 is formed in the duct 300 integrally connected to a plurality of safety vents 151 of the plurality of battery cells 100, and operates on all of the plurality of battery cells, so that the battery module 10 may have a uniform operating pressure as a whole. Therefore, according to the embodiment of the present invention, improved safety can be secured, as compared to a case where the membrane operates on each battery cell basis.

In addition, since only a single membrane is installed on each battery module, the number of components is reduced, thereby reducing the manufacturing cost of the battery module and simplifying the manufacturing process.

Figure 4:
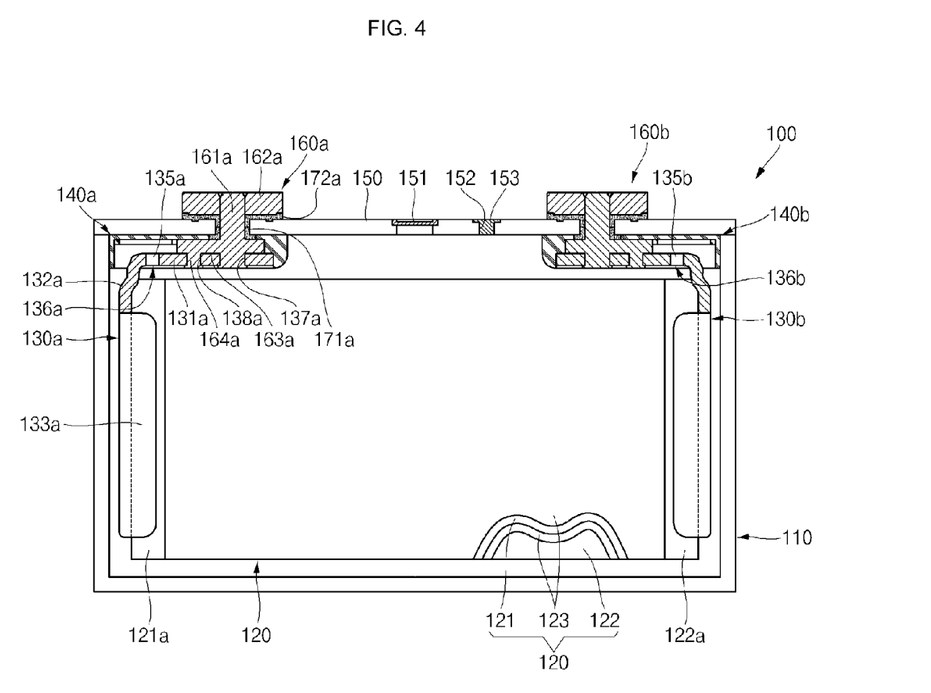
FIG. 4 is a horizontal section view illustrating an exemplary battery cell of a battery module according to an embodiment of the present invention.
Figure 5A:
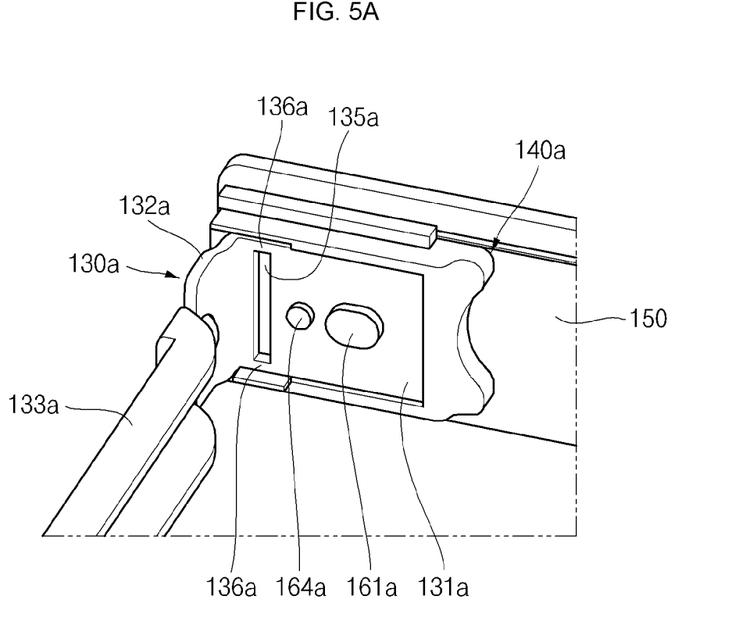
FIGS. 5A and 5B are perspective views illustrating examples of fuses formed in battery cells of a battery module according to an embodiment of the present invention.
Figure 5B:
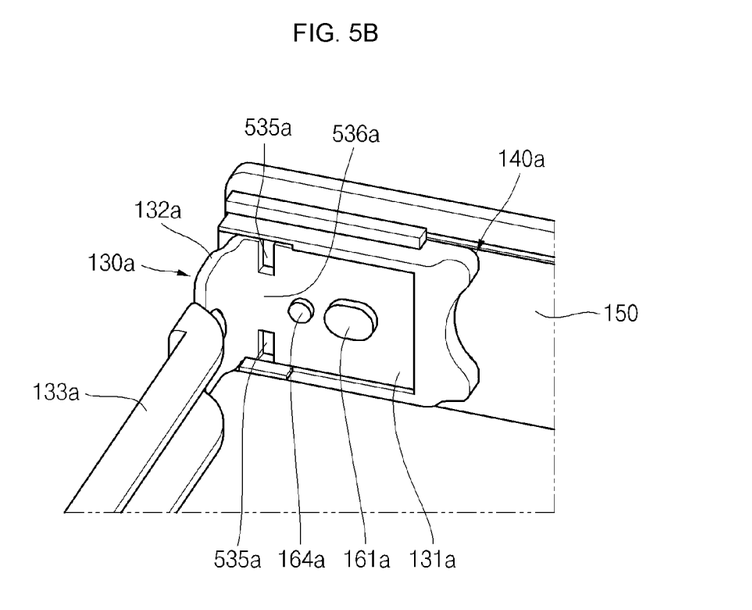

FIG. 4 is a horizontal section view illustrating an exemplary battery cell of a battery module according to an embodiment of the present invention, and FIGS. 5A and 5B are perspective views illustrating examples of fuses formed in battery cells of a battery module according to an embodiment of the present invention.

Referring to FIGS. 4, 5A and 5B, each of the battery cells 100 includes a case 110, an electrode assembly 120, a first collector plate 130a, a first insulation part 140a, a second collector plate 130b, a second insulation part 140b, a cap plate 150, a first terminal 160a and a second terminal 160b.

The case 110 has an internal receiving space and a top opening having a roughly hexahedral shape. In more detail, the case 110 includes a pair of long sidewalls, which are relatively wide, a pair of short sidewalls 112a and 112b, which are relatively narrow, a bottom wall, and an opening. Meanwhile, in the illustrated embodiment in which the case 110 and the cap plate 150 are assembled with each other, the opening is not illustrated. However, the opening corresponds to a substantially opened part of the periphery of the cap plate 150.

The electrode assembly 120 and an electrolytic solution are accommodated in the case 110. In addition, the case 110 may be made of one selected from the group consisting of aluminum, an aluminum alloy, copper, a copper alloy, iron, an iron alloy, stainless steel or equivalents thereof, but the present invention does not limit the material of the case 110 to those listed herein. In addition, the case 110 may be electrically connected to one of first and second electrode plates of the electrode assembly 120. That is to say, the case 110 may have one of a positive polarity and a negative polarity.

The electrode assembly 120 may be formed by winding or laminating a stack of a first electrode plate 121, a second electrode plate 122, and a separator 123 interposed between the first and second electrode plates 121 and 122, which may have a thin plate or film shape. The first electrode plate 121 may function as a positive electrode and the second electrode plate 122 may function as a negative electrode. Alternatively, the first electrode plate 121 and the second electrode plate 122 may function oppositely.

The first electrode plate 121 may be formed by applying a first electrode active material (such as transition metal oxide) to a first electrode current collector formed of metal foil (such as aluminum or an aluminum alloy). The first electrode plate 121 may include a first non-coating portion 121a to which the first electrode active material is not applied. The first electrode non-coating portion 121a may function as a current flow passage between the first electrode plate 121 and a first collector plate 130a. In the current embodiment, materials that may be used to form the first electrode plate 121 are not limited to the above-mentioned materials.

The second electrode plate 122 may be formed by applying a second electrode active material (such as graphite or carbon) to a second electrode current collector formed of metal foil (such as aluminum foil). The second electrode plate 122 may include a second electrode non-coating portion 122a to which the second electrode active metal is not applied. The second electrode non-coating portion 122a may function as a current flow passage between the second electrode plate 122 and a second collector plate 130b. In the current embodiment, materials that can be used to form the second electrode plate 122 are not limited to the above-mentioned materials. The first and second electrode plates 121 and 122 may be arranged with different polarities.

The separator 123 may be located between the first electrode plate 121 and the second electrode plate 122 to prevent a short circuit and to allow movement of charges (such as lithium ions). The separator 123 may be formed of a polyethylene film, a polypropylene film, or a composite film including polyethylene and polypropylene. In the current embodiment, materials that can be used to form the separator 123 are not limited to the above-mentioned materials.

One or more of the electrode assemblies 120 are provided to then be accommodated in the case 110 with an electrolytic solution. The electrode assembly 120 has the first and second non-coating portions 121a and 122a extending a predetermined length in opposite directions from coating portions with electrode active materials coated thereon. That is to say, the first and second non-coating portions 121a and 122a extend a predetermined length toward the short sidewalls of the case 110.

The electrolytic solution may include an organic solvent such as ethylene carbonate (EC), propylene carbonate (PC), diethyl carbonate (DEC), ethyl methyl carbonate (EMC), dimethyl carbonate (DMC), and a lithium salt such as $LiPF_6$ or $LiBF_4$. In addition, the electrolytic solution may be in a liquid, solid or gel phase.

The first collector plate 130a is positioned inside the case 110 and is electrically connected between the first terminal 160a and the electrode assembly 120. In detail, the first collector plate 130a has a first region 131a electrically connected to the first terminal 160a and a second region 132a bent from the first region 131a and electrically connected to the first non-coating region 121a of the electrode assembly 120. Further, the second region 132a may further have a third region 134a welded to the first non-coating region 121a. With this configuration, the electrode assembly 120 is constructed such that it substantially clings to the first collector plate 130a. That is to say, the electrode assembly 120 is basically pulled down from the first collector plate 130a because of gravity. Meanwhile, a bottom region of the electrode assembly 120 is spaced a predetermined distance apart from the bottom wall of the case 110.

A substantially rectangular fuse hole 135a is formed in the first region 131a of the first collector plate 130a. A pair of fuses 136a each having a relatively small sectional area is formed at opposite sides of the fuse hole 135a. That is to say, a width of each of the fuses 136a is smaller than a width of the first region 131a or the second region 132a. In order to form the fuses 136a, the fuse hole 135a formed in the first region 131a is illustrated in FIG. 5A. However, as shown in FIG. 5B, cut-out portions 535a may be formed at opposite sides of a fuse 536a.

The fuse 136a is melted by heat generated due to an over-current flowing in an event of an external short circuit or an overcharge of the battery cells 100 to cut off a charge and/or discharge current. Accordingly, the safety of each of the battery cells 100 can be improved.

Meanwhile, coupling holes 137a and 138a, to which a fastening region 161a of the first terminal 160a and a coupling protrusion 164a to later be described are coupled, may be formed in the first region 131a of the first collector plate 130a.

The first collector plate 130a may include, but not be limited to, aluminum, an aluminum alloy, titanium, stainless steel, gold, tantalum, niobium, hafnium, zirconium, vanadium, indium, cobalt, tungsten, tin, beryllium, molybdenum, or alloys thereof. In an example, when the first collector plate 130a is made of aluminum, the fuse 136a is also made of aluminum. A melting point of aluminum is approximately 659° C. Thus, if the temperature of the fuse 136a rises to approximately 659° C. due to over-current, the fuse 136a is naturally melted and cut. Here, the longer the time taken for the fuse 136a to be melted and cut, the longer the arc discharge time, thereby making each of the battery cells 100 internally unstable.

The first insulation part 140a is configured to roughly surround the first region 131a of the first collector plate 130a. That is to say, the first insulation part 140a is positioned between the cap plate 150 and the first region 131a of the first collector plate 130a and surrounds the fastening region 161a of the first terminal 160a, a flange 163a and the first region 131a of the first collector plate 130a. Therefore, the first terminal 160a and the first collector plate 130a may be electrically insulated from the cap plate 150 by the first insulation part 140a. The first insulation part 140a may be formed of polyphenylene sulfide (PPS) not reacting with the electrolytic solution and an equivalent thereof, but aspects of the present invention are not limited thereto.

The cap plate 150 covers an open region of the case 110 while allowing the first terminal 160a to be exposed or protruded to the outside. A boundary between the case 110 and the cap plate 150 may be welded using laser beams. In addition, the cap plate 150 and the case 110 may be made of the same material.

A safety vent 151 having a relatively small thickness is formed at a center of the cap plate 150.

When the internal pressure of the case 110 exceeds a reference pressure due to, for example, overcharge, the safety vent 151 is opened earlier than other parts of the cap plate 150 to release gases, thereby reducing a possibility of explosion due to an increase in the internal pressure. Here, the safety vent 151 may have an operating pressure of 2 to 4 kgf. The gases released from the safety vent 151 are induced into the duct 300.

In addition, an electrolytic solution injection hole 152 through which an electrolytic solution is injected may be formed at one side of the cap plate 150. Once the electrolytic solution is injected into the case 110, a plug 153 may be fitted into the electrolytic solution injection hole 152.

The first terminal 160a is electrically connected to the first collector plate 130a and passes through the cap plate 150 to then outwardly extend a predetermined length. That is to say, the first terminal 160a is coupled to the first region 131a of the first collector plate 130a and passes through the first insulation part 140a and the cap plate 150 to then outwardly extend a predetermined length. The first terminal 160a is electrically and mechanically coupled to the coupling hole 137a provided in the first region 131a of the first collector plate 130a and includes the fastening region 161a shaped of a pillar, and a fixing region 162a fixed to the fastening region 161a provided outside the case 110 or the cap plate 150 and coupled with a bus bar, etc. In addition, the flange 163a shaped of a plate horizontally extending a predetermined length is further formed inside the case 110 or the cap plate 150 of the fastening region 161a. The flange 163a includes the downwardly extending coupling protrusion 164a coupled to another coupling hole 138a provided in the first region 131a of the first collector plate 130a.

After the fastening region 161a positioned above the cap plate 150 is coupled to the fixing region 162a, it is riveted or welded. The fastening region 161a and the coupling protrusion 164a positioned below the cap plate 150 are coupled to the coupling holes 137a and 138a provided in the first region 131a of the first collector plate 130a to then be riveted or welded.

The first terminal 160a may include one selected from aluminum, an aluminum alloy and equivalents thereof, but not limited thereto.

An insulation gasket 171a may further be formed on the outer circumference of a portion of the fastening region 161a of the first terminal 160a, passing through the cap plate 150. In addition, an upper insulation part 172a may be interposed between the fixing region 162a and the cap plate 150. The upper insulation part 172a may be brought into close contact with the insulation gasket 171a. The upper insulation part 172a insulates the first fixing region 162a and the cap plate 150 from each other. The insulation gasket 171a may be formed of perfluoroalkoxy (PFA) not reacting with the electrolytic solution, but aspects of the present invention are not limited thereto. In addition, the upper insulation part 172a may be formed of polyphenylene sulfide (PPS) not reacting with the electrolytic solution, but aspects of the present invention are not limited thereto.

Meanwhile, configurations of the second collector plate 130b, the second insulation part 140b and the second terminal 160b are basically the same as those of the first collector plate 130a, the first insulation part 140a and the first terminal 160a, respectively. In addition, a fuse hole 135b and a fuse 136b may also be provided in the second collector plate 130b. In some cases, the fuse hole 135b and the fuse 136b may not be provided in the second collector plate 130b. The reason of the foregoing will now be briefly described. The second collector plate 130b is generally made of copper or a copper alloy. Copper has a melting point of approximately 1,083° C., which is higher than that of aluminum. That is to say, before the fuse 136b of the second collector plate 130b starts to operate, the fuse 136a of the first collector plate 130a operates first, so that a charge current and/or a discharge current is cut off. However, in order to further improve the safety of the battery cell 100, the fuse hole 135b and the fuse 136b of the second collector plate 130b may be provided.

Figure 6:
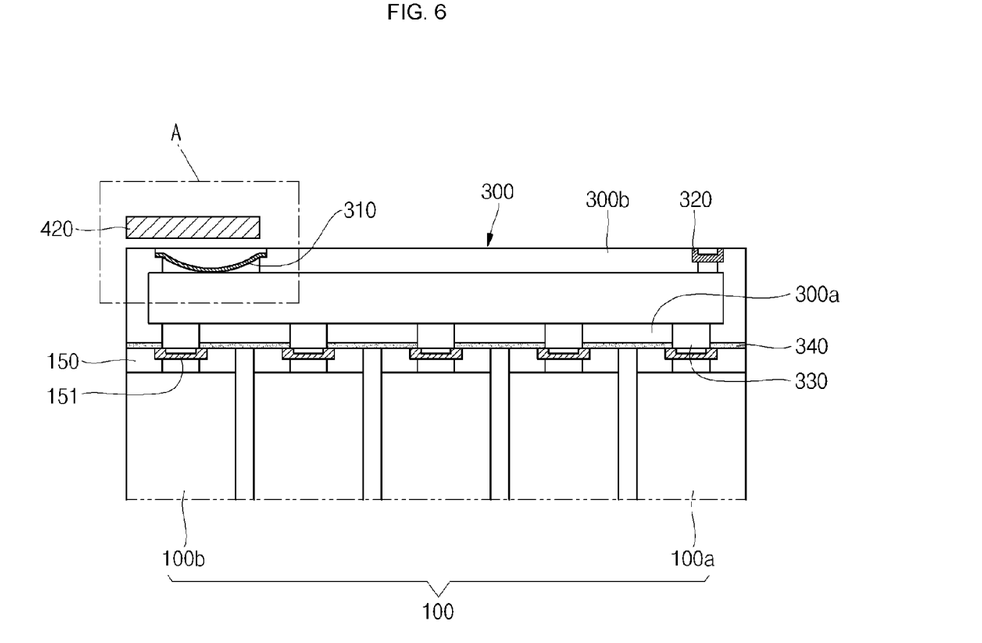
FIG. 6 is a cross-sectional view illustrating a top portion of a battery module according to an embodiment of the present invention.
Figure 7A:
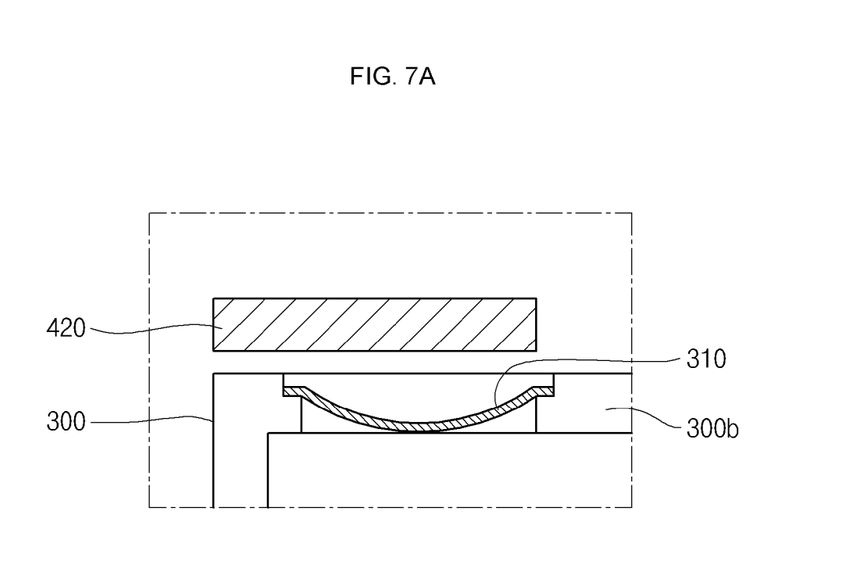
FIGS. 7A and 7B are enlarged cross-sectional views illustrating a relationship between a short-circuit plate and a membrane before and after an 'A' portion of a battery module is short-circuited.
Figure 7B:
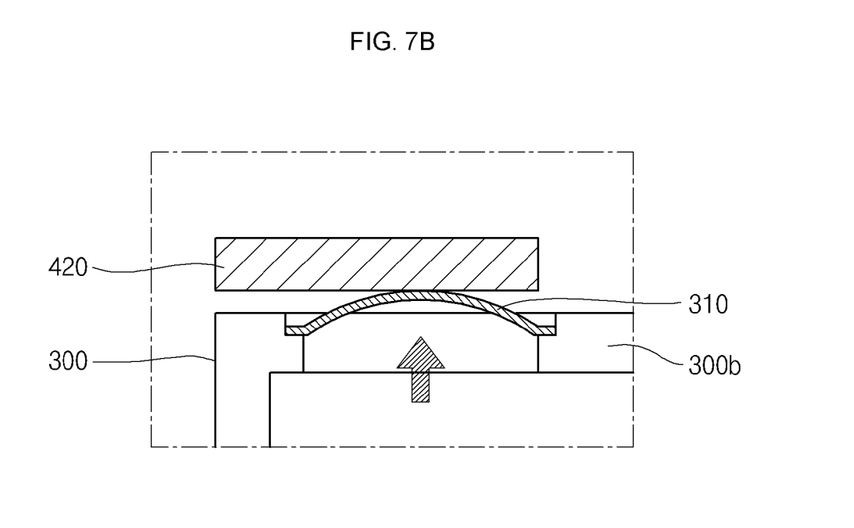

FIG. 6 is a cross-sectional view illustrating a top portion of a battery module according to an embodiment of the present invention, and FIGS. 7A and 7B are enlarged cross-sectional views illustrating a relationship between a short-circuit plate and a membrane before and after an 'A' portion of a battery module is short-circuited.

Referring to FIG. 6, the duct 300 is shaped of a rectangular parallelepiped having an empty inner space and is positioned on the cap plate 150 of each of the plurality of battery cells 100. Here, in order to insulate the battery cells 100 and the duct 300 from each other, an insulation layer 340 is interposed between the battery cells 100 and the duct 300. In more detail, the duct 300 has the first region 300a facing the cap plate 150 and the second region 300b facing and spaced apart from the first region 300a, and the insulation layer 340 is interposed between the first region 300a and the cap plate 150.

The duct 300 has the through hole 330 formed at a region corresponding to the safety vent 151 of the cap plate 150. Therefore, when the internal pressure of each of the battery cells 100 increases due to overcharge of the battery module, the safety vent 151 is opened, so that the internal gases are induced into the duct 300. Here, the insulation layer 340 may also have a hole formed at a region corresponding to the safety vent 151 of each of the battery cells 100.

Meanwhile, the vents 320 thinner than other parts of the second region 300b are formed at one side of the second region 300b. When the internal pressure of the duct 300 exceeds a predetermined level, the vents 320 are opened to release internal gasses to the outside. Here, the vents 320 may have an operating pressure of 6 to 9 kgf.

In addition, the membrane 310 formed convexly toward the first region 300a is provided at the other side of the second region 300b. The membrane 310 has a smaller thickness than the second region 300b of the duct 300. In a normal state (that is, a state in which the battery cell is not overcharged), the membrane 310 is convex toward the first region 300a, and in an abnormal state (that is, a state in which the battery cell is overcharged), it is inverted to be convex in a direction away from the first region 300a due to an increase in the internal pressure of the duct 300. Here, the membrane 310 is electrically connected to the short-circuit plate 420 to then be short circuited.

In particular, as shown in FIG. 7A, when the battery module is in a normal state, the short-circuit plate 420 is not short circuited to the membrane 310. That is to say, in the normal state of the battery module, the short-circuit plate 420 and the membrane 310 are spaced apart from each other. However, as shown in FIG. 7B, when the battery module is in an abnormal state, the short-circuit plate 420 and the membrane 310 are short circuited. That is to say, when each of the battery cells 100 is overcharged, gases are generated from an electrolytic solution or an active material, so that the internal pressure of each of the battery cells 100 increases. Accordingly, the safety vent 151 is opened, so that the gases are induced from the battery cells 100 to the duct 300. When the internal pressure of the duct 300 exceeds a predetermined level, the membrane 310 that is convex toward the first region 300a is inverted and is brought into contact with the short-circuit plate 420 to then be short circuited.

Figure 8A:
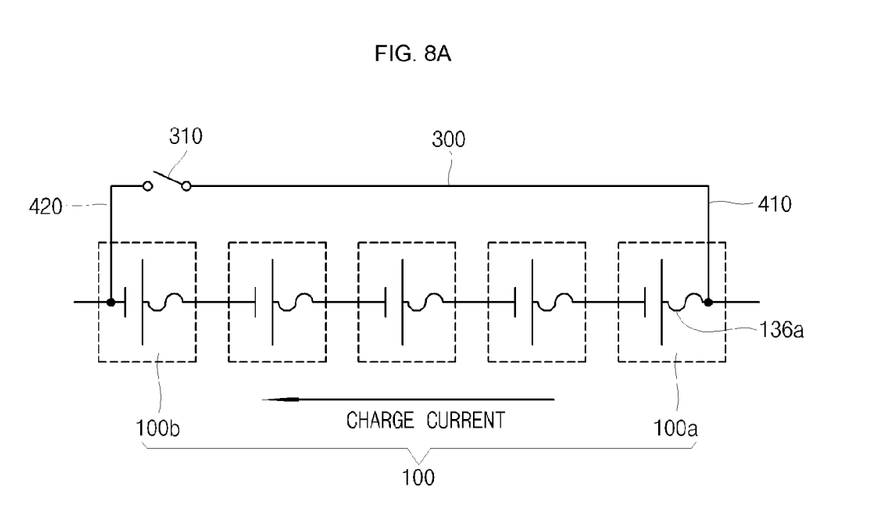
FIGS. 8A to 8C are circuit diagrams for explaining the operation of a battery module according to an embodiment of the present invention during overcharge.
Figure 8B:
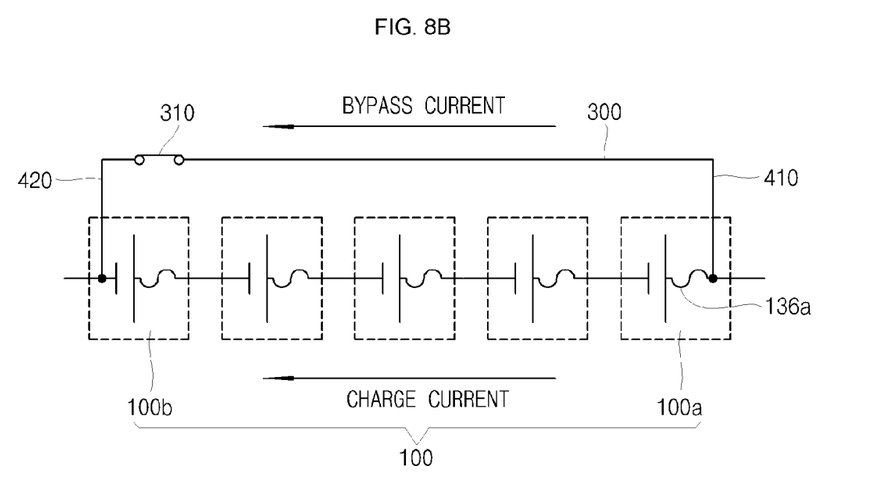
Figure 8C:
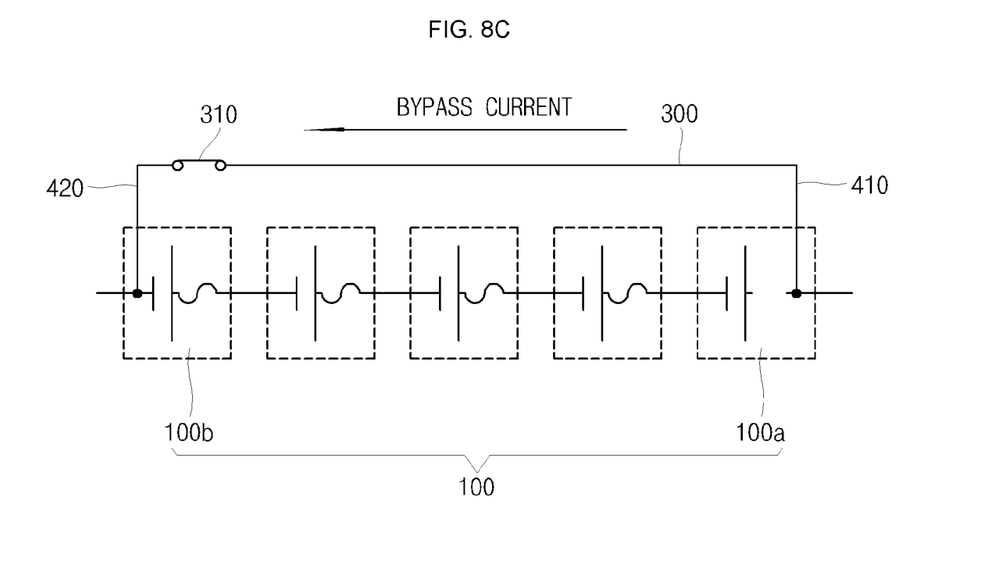

FIGS. 8A to 8C are circuit diagrams for explaining the operation of a battery module according to an embodiment of the present invention during overcharge.

As shown in FIG. 8A, in the battery module 10 shown in FIG. 1, five battery cells 100 each having the fuse 136a are connected to each other in series. In addition, a duct 300 having a switch 310 is further provided between the first battery cell 100a and the second battery cell 100b. Here, the first battery cell 100a is electrically connected to one side of the duct 300 by the extension plate 410, and the second battery cell 100b is electrically connected to the other side of the duct 300 by the short-circuit plate 420. Meanwhile, the switch 310 substantially corresponds to the membrane 310. In addition, when the battery module 10 is charged, a charge current may flow from the first battery cell 100a to the second battery cell 100b.

As shown in FIG. 8B, when the battery module 10 is overcharged, the membrane 310 of the duct 300 operates to be short circuited to the short-circuit plate 420, which corresponds to a case where the switch 310 is "turned on" in a circuit view. That is to say, when the battery module 10 is overcharged, the internal pressure of each of the battery cells 100 increases, so that the membrane 310 is inverted to be short circuited to the short circuit plate 420.

As shown in FIG. 8C, when the battery module 10 is overcharged, the fuse 136a of each of the first battery cells 100a is melted and cut for the first time, so that a charge current is not supplied to each of the battery cells 100 to then be bypassed through the switch, i.e., the membrane 310, and the duct 300. Here, the fuse 136a of the first battery cell 100a is melted and cut for the first time because the charge current is supplied earliest to the first battery cell 100a. In addition, the states shown in FIGS. 8B and 8C are established almost at the same time.

As described above, according to the present invention, when the battery module 10 is overcharged, the charge current is not supplied to each of the battery cells 100 but is bypassed through the duct 300, thereby improving overcharge safety of the battery module 10.

Although the battery module according to exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery module comprising:
   a plurality of battery cells arranged in a row, each of the plurality of battery cells including first and second terminals and a safety vent;
   a plurality of bus bars connecting the plurality of battery cells;
   a duct mechanically coupled to the plurality of battery cells to seal the safety vent and having a space that is in communication with the safety vents of the plurality of battery cells;
   an extension plate electrically connected to a first terminal of a first battery cell among the plurality of battery cells and extending toward the duct; and
   a short-circuit plate electrically connected to a second terminal of a second battery cell among the plurality of battery cells and extending toward the duct,
   wherein the duct is electrically connected to the extension plate and is spaced apart from the short-circuit plate,
   wherein the duct includes a membrane which is electrically connected to the extension plate,
   wherein the membrane is connected to the short-circuit plate when the battery module is overcharged.

2. The battery module of claim 1, wherein the first battery cell is a battery cell positioned in the first place among the plurality of battery cells arranged in a row, and the second battery cell is a battery cell positioned in the last place among the plurality of battery cells.

3. The battery module of claim 1, wherein the duct includes a first region facing the plurality of battery cells and a second region spaced apart from the first region and wherein a through hole corresponding to the safety vent of each of the battery cells is provided in the first region of the duct.

4. The battery module of claim 1, wherein when the battery module is overcharged, the safety vent of each of the battery cells is opened due to an increase in the internal pressure of the battery cell to release internal gases to the duct.

5. The battery module of claim 1, wherein the short-circuit plate has one side connected to the second terminal of the second battery cell and the other side spaced apart from the membrane at a location corresponding to the membrane.

6. The battery module of claim 1, wherein when the battery module is overcharged, the membrane is inverted due to an increase in the internal pressure of the duct to then be electrically short circuited to the short-circuit plate.

7. The battery module of claim 1, wherein the duct further includes vents thinner than the walls of the duct.

8. The battery module of claim 7, wherein the vents have a higher operating pressure than the safety vent of each of the battery cells.

9. The battery module of claim 1, wherein an insulation layer is interposed between the duct and each of the battery cells to electrically insulate the duct and the battery cell.

10. The battery module of claim 9, wherein the insulation layer has a hole formed at a region corresponding to the safety vent of each of the battery cells.

11. The battery module of claim 1, wherein the extension plate has one side connected to the first terminal of the first battery cell and the other side connected to the duct.

12. The battery module of claim 1, wherein the short-circuit plate is positioned higher than the extension plate on the basis of the duct.

13. The battery module of claim 1, wherein each of the battery cells includes an electrode assembly, a case accommodating the electrode assembly, and a cap plate which seals the case and through which the first and second terminals pass.

14. The battery module of claim 13, wherein the safety vent is thinner than the cap plate at a portion of the cap plate.

15. The battery module of claim 13, wherein each of the battery cells further includes a fuse provided between the electrode assembly and the first terminal.

16. The battery module of claim 15, wherein the fuse is melted to then be cut when the battery module is overcharged.

* * * * *